United States Patent [19]
Haas et al.

[11] 4,264,568
[45] Apr. 28, 1981

[54] METHOD FOR EASILY REMOVING ZINC FROM CARBON BLACK CONTAMINATED WITH ZINC

[75] Inventors: Frank C. Haas, Arvada; Manuel M. Gutierrez, Westminster, both of Colo.

[73] Assignee: Tosco Corporation, Los Angeles, Calif.

[21] Appl. No.: 78,888

[22] Filed: Sep. 25, 1979

Related U.S. Application Data

[63] Continuation of Ser. No. 876,987, Feb. 13, 1978, abandoned.

[51] Int. Cl.³ ............................................. C01B 31/02
[52] U.S. Cl. .................................................... 423/461
[58] Field of Search ....................... 423/449, 450, 461

[56] References Cited

U.S. PATENT DOCUMENTS

| | | | |
|---|---|---|---|
| 2,149,671 | 3/1939 | Franck | 423/461 |
| 2,698,777 | 1/1955 | Hartwick et al. | 423/461 |
| 3,226,316 | 12/1965 | Metrailer et al. | 423/461 |
| 3,878,051 | 4/1975 | Long et al. | 423/465 |

*Primary Examiner*—O. R. Vertiz
*Assistant Examiner*—Gregory A. Heller
*Attorney, Agent, or Firm*—Poms, Smith, Lande & Rose

[57] ABSTRACT

The present invention relates to a method for removing zinc from solid carbon black, preferably obtained from the pyrolysis of rubber, said carbon black containing at least 3%, by weight, of zinc, calculated as ZnO, said method including the steps of contacting the carbon black at a temperature of at least 750° C. with a gas selected from chlorine and hydrogen chloride to form gaseous zinc chloride from the zinc contained in said carbon black, and separating the gaseous zinc chloride from the solid carbon black.

12 Claims, No Drawings

METHOD FOR EASILY REMOVING ZINC FROM CARBON BLACK CONTAMINATED WITH ZINC

CROSS-REFERENCE TO OTHER APPLICATIONS

This application is a stream-lined continuation application of copending application Ser. No. 876,987, filed Feb. 13, 1978, now abandoned.

BACKGROUND OF THE INVENTION

As is known in the art, carbon black is a very useful commodity and is obtained from many resources. Among the valuable uses of carbon black is in the production of rubber tires. As a matter of fact, outside of rubber, the major portion of rubber tires is carbon black, and it would be very desirable if such carbon black contained in rubber tires could be reused again. The recycling of carbon black and obtaining useful products from rubber contained in tires serves a two-fold purpose: first, it would conserve our valuable resources and, second, it would ease the problem of what to do with discarded rubber tires. For example, at least two hundred million rubber tires are discarded in the United States every year. And, although such tires make up a relatively small fraction of the solid waste, tires are very difficult to dispose of.

When rubber tires are burned, they give off large quantities of unburned hydrocarbons which are highly visible and noxious. Moreover, the problem of disposing of scrap rubber tires is not solved by using the tires as land fill because tires are resistant to natural decomposition and eventually emerge at the surface of the land fill where their appearance is objectionable.

Another approach to the problem of what to do with discarded rubber containing carbon black, for example, rubber tires, is to pyrolyze the rubber tires to obtain valuable hydrocarbons therefrom. However, after the hydrocarbons are removed, a great deal of solid material remains, said solid material (usually called char) being composed primarily of carbon black and inorganic material primarily composed of zinc and sulfur. Carbon black cannot be successfully reused to make, for example, rubber tires, unless such inorganic material is removed from the carbon black. Moreover, since the primary metal included within the inorganic material is zinc, normally as zinc oxide, it is desirable to remove the zinc in order to render the solid char reusable in producing rubber tires, and, at the same time, recovering the zinc in order to be able to reuse this valuable metal.

SUMMARY OF THE INVENTION

The present invention relates to a method or process of removing zinc from carbon black (for example, char residue remaining after pyrolyzing of scrap rubber) containing upwards of 3% zinc, calculated as zinc oxide. Additionally, the present process provides for the recovery and reuse of the zinc as well as allowing the char, composed primarily of carbon black, to be reused, for example, in the production of rubber tires or any other product using carbon black. In essence, the present invention allows for the recycling of solid carbon black which is contaminated with zinc oxide and perhaps other inorganic materials such as sulfur, calcium oxide, and very minor amounts of other metals.

It is therefore the primary object of the present invention to disclose and provide a process for removing substantially all of the zinc or zinc oxide contained in carbon black in order to be able to recycle the carbon black and to recover the zinc contained in said carbon black.

A further object of the present invention is to disclose and provide an economical process for recycling carbon black and retaining zinc oxide by simple and economical process wherein the carbon black is merely contacted with a gas such as chlorine at a temperature of from about 750° C. to 1000° C. or 1200° C. and separating the volatile zinc chloride formed thereby from the solid carbon black.

Other objects of the present invention will be apparent to those skilled in the art from the following detailed description wherein all parts and percentages are by weight, unless expressly stated otherwise, and all temperatures are in degrees centigrade unless expressly stated otherwise.

DESCRIPTION OF THE PREFERRED EMBODIMENTS

In the preferred exemplary embodiments, the present invention will be illustrated with char produced from scrap rubber, said char being composed of primarily carbon black (e.g. from 60% to 70%, by weight, of carbon black, to as high as 85% to 90% carbon black). The remainder of the char is usually designated as ash and the predominant portion of the ash is zinc, as zinc oxide, and sulfur. That is to say, of the ash, at least 50% thereof will be zinc, as zinc oxide, and sulfur. In general, the zinc oxide will comprise at least 3% of the total weight of the char and the sulfur will normally comprise at least 1% to 2% of the char. In the preferred exemplary embodiments, the char used is obtained by pyrolyzing scrap rubber by contacting the rubber with heat carrying solids in a rotating retort. During the pyrolysis step, because of the rotation of the retort, the heat carrying solids (which are preferably ceramic) are mixed with the rubber so that not only is the heat transferred from the heat carrying solids to the rubber but the rubber is ground so that the solid remaining after the pyrolysis and grinding step is of very fine particle size. Because of this very fine particle size, there is a problem with "dusting". Therefore, it is normal, in order to prevent "dusting", to make pellets of the finely divided particles of carbon black. Surprisingly, the present invention can remove, for example, the zinc oxide, from such carbon black pellets and not adversely affect the physical integrity of the pelletized carbon black. That is, after pelletized carbon black is subjected to the instant process, the pelletized carbon black does not lose its shape or form; however, it should be noted that the pelletized carbon black may lose some of its strength but not in such an amount that dusting is a problem.

The objects of the present invention are accomplished by contacting carbon black, contaminated with zinc oxide and sulfur, wherein the carbon black is either in finely divided form or in pelletized form, with non-aqueous chlorine gas or hydrogen chloride gas at a temperature of at least about 750° C., and preferably, 750° C. to about 1000° C. or 1200° C. Surprisingly, using either chlorine gas or hydrogen chloride gas at such temperatures removes at least 18% of the zinc contaminating the carbon black and in actual practice, over 99%, by weight, of the zinc was removed utilizing the process of the present invention. Substantially all of the zinc removed can be recovered and recycled.

The amount of chlorine gas or hydrogen chloride gas used in purifying the carbon black contaminated with zinc or zinc oxide can vary widely, but since one of the objects of the present invention is to insure that all, or substantially all, of the zinc oxide or zinc is removed, it is therefore desirable if at least a stochiometric amount of chlorine gas or hydrogen chloride gas is allowed to contact the carbon black. It is preferred if a stochiometric excess of chlorine contacts the carbon black. The actual amount of chlorine which should contact the carbon black can be determined by testing the vapors given off with potassium iodide which will indicate when free chlorine is present in the volatile gas. If such occurs, then this indicates that substantially all of the zinc or zinc oxide has been removed as a volatile zinc chloride salt.

The reaction between zinc oxide and chlorine, in the presence of carbon, is as follows: $3ZnO+3Cl_2+2C \rightarrow 3ZnCl_2+CO+CO_2$. Thus, it can be seen that for one mole of zinc oxide present in the ash, at least one mole of chlorine should be used. Stated differently, for every one hundred parts, by weight, of zinc oxide, at least about ninety parts, by weight, of chlorine should be used. However, since the zinc oxide is present in relatively small amounts, some of the chlorine will not react with the zinc oxide, at least equal amounts of chlorine should be used based on the weight of the zinc oxide present.

We have found that, in general, for every one hundred parts of carbon black containing at least 3%, by weight, of zinc, calculated as zinc oxide, there should be used at least twenty parts, by weight, of chlorine, and preferably, at least thirty or forty parts, by weight, of chlorine. There is no maximum amount of chlorine that should be used since, once the reaction is complete, it makes no difference if more chlorine is added except, of course, it is uneconomical. However, from a practical standpoint, we have found that, in general, no more than one hundred parts need be used for each one hundred parts, by weight, of carbon black containing the zinc. The reason that more than a stochiometric excess of chlorine is desirable is because a certain amount is retained in the carbon black and a certain amount reacts with other oxides present in the carbon black reacting with the zinc, and if present, the sulfur. The amounts indicated above also insure that substantially all of the zinc oxide and sulfur, if present, is removed.

It should be noted that gaseous, non-aqueous hydrogen chloride works equally as well as chlorine in the present invention. Moreover, the amount of hydrogen chloride necessary to be used in the present invention is about the same as the amount of chlorine gas since the molecular weight of hydrogen chloride is about half as great as chlorine gas and because hydrogen chloride provides half as much chlorine as gaseous chlorine does. Thus, from a practical standpoint, at least about twenty parts, by weight of hydrogen chloride should be used for each one hundred parts, by weight of carbon black containing zinc oxide, and sometimes sulfur. It is preferable if at least thirty parts, by weight, or forty parts, by weight, of hydrogen chloride is used for each one hundred parts, by weight, of carbon black since this insures that substantially all of the zinc and sulfur, if present, is removed from the carbon black. Also, as pointed out above with respect to the chlorine gas, we have found that in general, the maximum amount of hydrogen chloride generally necessary is one hundred parts, by weight of chlorine for each one hundred parts of carbon black.

As has been noted, the temperature at which the non-aqueous gaseous chlorine, or non-aqueous, gaseous hydrogen chloride contacts the carbon black should be at least about 750° C. From purely theoretical consideration, there is no maximum temperature, but we have found that there is no reason to exceed 1000° C. or 1200° C. Since the reaction between zinc oxide and chlorine or hydrogen chloride is an exothermic reaction, the temperature is relatively easy to maintain.

In the following examples, one type of rubber was used as a starting material to produce the contaminated carbon black used in the preferred exemplary embodiments. However, it should be emphasized that the contaminated carbon black can be obtained from any source and the method of the present invention is useful in treating such carbon black. In the preferred exemplary embodiments, the carbon black contained approximately 6%, by weight, of zinc oxide and approximately 3%, by weight, of sulfur, the remaining part of the carbon black being carbon with minor amounts of other oxides such as calcium oxide. It must be kept in mind that because of the fact that the carbon black was produced from the pyrolysis of scrap rubber, all the volatile material was removed from the rubber.

In general, the carbon black was produced as follows:

Raw rubber, either per se or after being shredded and dried was fed into a rotating retort together with heat carrying solids, the temperature of the solids being sufficient to heat the rubber to the pyrolysis temperature for a period of from about three minutes to ten minutes, and preferably, between five and eight minutes. In general, the temperature of the heat carrying solids is about 1200° F. when entering the retort and the pyrolysis temperature reached by the rubber is between about 950° F. to 1000° F. After pyrolysis has been completed, which pyrolysis was conducted in the absence of oxygen, the vapors produced therefrom (which are generally hydrocarbons) are separated from the solid char material which is composed of very fine particles having an average diameter of less than 1 micron, and usually less than 0.5 microns, said char material being substantially free of coke and nondecomposed rubber. As noted, this char material is primarily carbon black contaminated with about 6%, by weight, of zinc oxide, and about 3%, by weight, of sulfur.

Because of the "dusting" problem noted hereinbefore, the fine particle sized carbon black is formed into pellets of about one-eighth inch in diameter. The reaction temperature of from 750° C. to 1000° C. or 1200° C. can be obtained by either heating the carbon black in the reaction zone to the appropriate temperature or heating the chlorine or hydrogen chloride to the appropriate temperature, or both. In the preferred exemplary embodiments, we first heat the carbon black pellets, obtained as indicated above, to a temperature of about 375° C. in a nitrogen atmosphere. The reason for using a nitrogen or inert atmosphere is to prevent oxidation of the carbon black thereby rendering the carbon black less useful for recycling purposes, as for example, adding the carbon black to rubber to produce rubber tires.

The reaction zone, within which the carbon black is placed, is a horizontal or vertical furnace having a condenser at the exit end of the furnace. The carbon black is first heated, as noted above, in an inert atmosphere such as nitrogen to a temperature of 375° C. After this temperature was reached, chlorine was added to the reaction zone (furnace) so that the chlorine came into intimate contact with the pellets of carbon black placed in the reaction zone. Generally speaking, free chlorine did not appear until after about sixty to eighty minutes. In all of the examples, except for one of the tests conducted at 800° C., chlorine addition was continued for an additional twenty minutes after the appearance of free chlorine and then the test was terminated. In one of the tests conducted at 800° C., (in the following Table, Test No. 3), the test was immediately terminated after the appearance of free chlorine in the exit gas.

The following Table I indicates the temperature at which the test was conducted, the amount of carbon black, in parts by weight, charged to the reaction zone, the amount of chlorine added, in parts by weight, and the length of run in minutes.

TABLE I

| OPERATING DATA FOR CHLORINATION TESTS | | | | |
|---|---|---|---|---|
| Test No. | 1 | 2 | 3 | 4 |
| Temperature, °C. | 750 | 800 | 800 (no soak) | 1000 |
| Carbon Black | 25 | 25 | 25 | 25 |
| Chlorine | 11 | 11 | 10 | 8 |
| Length of Run | 94 | 80 | 80 | 80 |

It should be noted that in testing for free chlorine gas, the test involved using a potassium iodide scrubber, which was attached to the condenser. The scrubber collected the gases coming off, to indicate when free chlorine was present. Temperatures at which the reactions were conducted were reached by heating the furnace to the appropriate temperature, after the chlorine gas was actually introduced into the furnace.

In the following Table II, the results of the zinc extraction and sulfur extraction are shown in weight percentages. The carbon black in the feed material contained 6.16 weight percent zinc as zinc oxide and 3.06 weight percent sulfur.

TABLE II

| SUMMARY OF CHLORINATION RESULTS OF CARBON BLACK | | | | |
|---|---|---|---|---|
| Test No. | 1 | 2 | 3 | 4 |
| Temperature, °C. | 750 | 800 | 800 (no soak) | 1000 |
| % Zinc Extraction | 99.3 | 99.6 | 99.3 | 99.7 |
| % Sulfur Extraction | 52.5 | 37.4 | 33.5 | 40.9 |

As can be seen from Table II, almost all of the zinc was extracted and about fifty percent of the sulfur was extracted from the carbon black. Moreover, the pelletized carbon black which was contacted with the chlorine, retained its physical shape and integrity and could be used, as such, to produce rubber tires.

As has been noted before, volatile zinc and sulfur chlorides were produced in the reaction. The zinc chloride was recovered and separated from the sulfur chloride by fractional condensation. Using such a method, all of the zinc chloride can be recovered and could be recycled to make useful products.

To remove the chlorine from the carbon black, which is not absolutely necessary to reuse the carbon black, ammonia was added to the carbon black at 800° C. thereby removing all of the chlorine retained in the carbon black.

Although in the preferred exemplary embodiment, only chlorine was used, it is to be understood that gaseous, non-aqueous hydrogen chloride can also be used with similar results.

We claim:

1. A method for purifying solid carbon black pellets without adversely affecting the physical integrity of said pellets, said carbon black pellets being contaminated with at least 3%, by weight, of zinc, calculated as zinc oxide, which comprises forming carbon black pellets from very fine carbon black particles having an average diameter of less than about one micron and contaminated with at least 3%, by weight, of zinc, calculated as zinc oxide; contacting said carbon black pellets contaminated with zinc at a temperature of at least about 750° C. with a non-aqueous gas selected from the group consisting of chlorine and hydrogen chloride thereby forming volatile zinc chloride, and separating the gaseous zinc chloride from the solid carbon black pellets.

2. A method in accordance with claim 1, wherein the non-aqueous gas contacts the carbon black pellets at a temperature of between about 750° C. to 1200° C.

3. A method according to claim 2, wherein the temperature is between 750° C. to 1000° C.

4. A method according to claim 1, wherein the amount of non-aqueous gas is at least twenty parts, by weight, based on one hundred parts, by weight, of the carbon black.

5. A method according to claim 4, wherein the amount of non-aqueous gas is from about twenty parts, by weight, to one hundred parts, by weight of carbon black.

6. A method according to claim 4, wherein the non-aqueous gas is chlorine.

7. A method according to claim 1, wherein the carbon black also contains sulfur.

8. A method for easily and economically removing zinc and sulfur from carbon black pellets without adversely affecting the physical integrity of the pellets, said carbon black being contaminated with at least 3%, by weight, of zinc, calculated as zinc oxide and at least 1%, by weight, of sulfur, which comprises forming carbon black pellets from very fine carbon black particles having an average diameter of less than about one micron and contaminated with at least 3%, by weight, of zinc, calculated as zinc oxide and at least 1%, by weight, of sulfur; contacting said carbon black pellets at a temperature of between about 750° C. to 1000° C. with a non-aqueous gas selected from the group consisting of chlorine and hydrogen chloride thereby forming gaseous zinc chloride and sulfur chloride and separating the gaseous zinc chloride and the sulfur chloride from the carbon black pellets.

9. A method according to claim 8, including the further step of separating the zinc chloride from the sulfur chloride.

10. A method according to claim 8, wherein the amount of non-aqueous gas is at least twenty parts, by weight, based on one hundred parts, by weight, of carbon black.

11. A method according to claim 8, wherein the amount of non-aqueous gas is between twenty parts, by weight, and one hundred parts, by weight, based on one hundred parts, by weight, of carbon black.

12. A method according to claim 8, wherein the non-aqueous gas is chlorine.

* * * * *